2 Sheets—Sheet 1.

S. H. LORING.

HOSE COUPLING.

No. 7,221. Reissued July 11, 1876.

Witnesses
John E. Crane
Wm. S. Brown

Inventor
Silas H. Loring

N. PETERS, PHOTO-LITHOGRAPHER, WASHINGTON, D. C.

2 Sheets—Sheet 2.

S. H. LORING.

HOSE COUPLING.

No. 7,221. Reissued July 11, 1876.

Witnesses
John E Crane
Wm S Brown

Inventor
Silas H Loring

N. PETERS, PHOTO-LITHOGRAPHER, WASHINGTON, D. C.

UNITED STATES PATENT OFFICE.

SILAS H. LORING, OF LAWRENCE, MASSACHUSETTS.

IMPROVEMENT IN HOSE-COUPLINGS.

Specification forming part of Letters Patent No. 58,850, dated October 16, 1866; reissue No. 7,221, dated July 11, 1876; application filed February 2, 1876.

*To all whom it may concern:*

Be it known that I, SILAS H. LORING, of Lawrence, in the county of Essex and State of Massachusetts, have invented a new and Improved Hose or Pipe Coupling; and I do hereby declare that the following is a full and exact description thereof, reference being had to the accompanying drawings, and to the letters of reference marked thereon.

Figure 1:
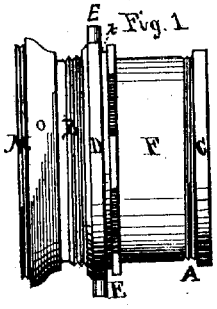
Figure 2:
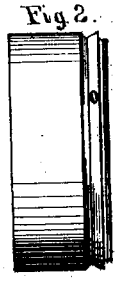
Figure 3:
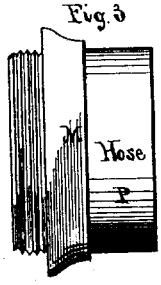
Figure 3:
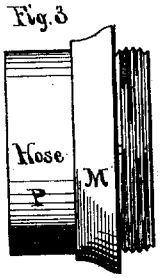
Figure 4:
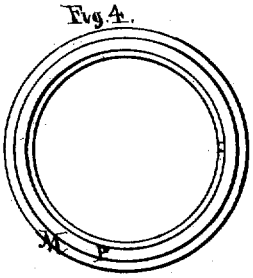
Figure 5:
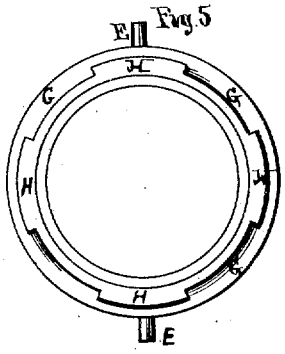
Figure 6:
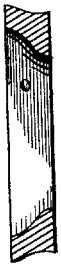
Figure 7:
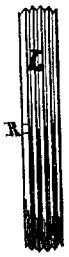
Figure 8:
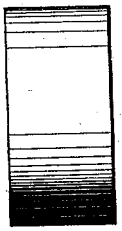
Figure 9:
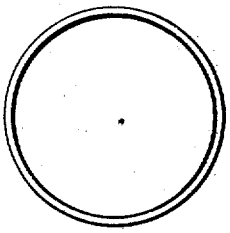
Figure 10:
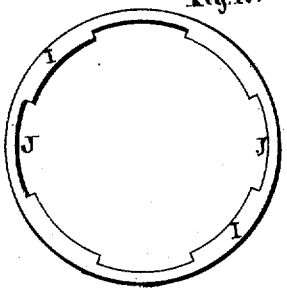
Figure 11:
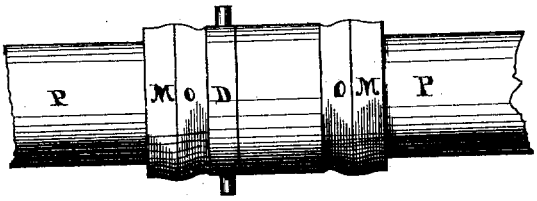
Figure 12:
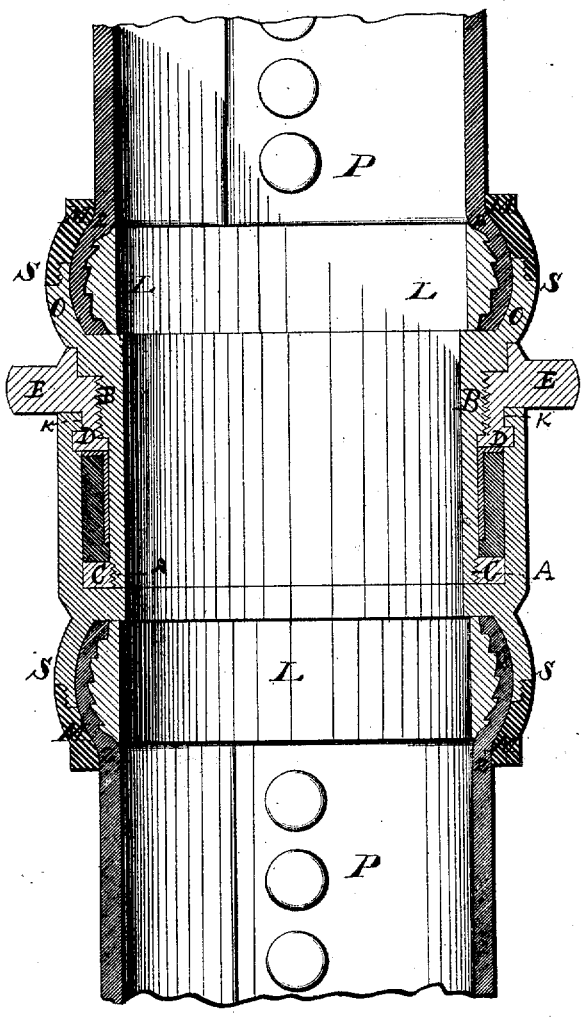

Figures 1 and 2 represent the two hollow cylinders, they being the two parts of the coupling, and also represent the mode of attaching the hose to the coupling. Fig. 4 represents a section showing the manner of connecting the hose between its external and internal ring. Fig. 5 represents a section of the band D, showing knobs E and slots and dogs G, and, also, the groove H, to receive the dogs and slots on the interior surface of Fig. 2. Fig. 6 represents an interior view of one part of the concave end of the coupling to receive the end of the hose. Fig. 7 represents the oval ring, which is placed within the hose, to hold it outward into the concave end of the coupling. Fig. 8 represents side view of expansion-packing. Fig. 9 represents a section of expansion-packing. Fig. 10 represents the slots and dogs in the end rim or flange of Fig. 1. Fig. 11 represents the coupling when put together. Fig. 12 represents a central longitudinal section of Fig. 11, but full size for practice.

To enable others skilled in the art to make and use my invention, I will proceed to describe its construction and operation.

I first take the hollow cylinders, Figs. 1 and 2, and upon the outside or convex surface of the hollow cylinder, Fig. 1, I cut the threads of a screw at A, to receive the threads of the female screw cut on the interioror concave surface of the rim C. I then cut the threads B, to receive the female screw cut on the concave surface of the band D. The band D is made to be turned or screwed on or off the threads B by means of spanner-wrench, which grasps the knobs E. The expansion-packing (see Figs. 8 and 9) occupies the place on the hollow cylinder, Fig. 1, marked F, and is a band of expansive material, as rubber or cork, and is placed on the convex surface of the cylinder, Fig. 1, and fills the space between the rim C and the band D, the band D being screwed up to its shoulder. I then screw up the rim C tight to its shoulder. The packing will then be confined between the rim C and the band D. Upon one end of the band D is an elevated rim with slots, as see G, and dogs, as see H, and see Figs. 1 and 5. These slots G are made to receive the dogs I on a rim in the inside or concave surface of the cylinder, Fig. 2, as see also Fig. 10, and the dogs H, to pass through the slot J in the said rim in Figs. 2 and 10. The slot and dogs in the cylinder, Fig. 2, are on a narrow rim on the inside of Fig. 2, and at the end of Fig. 2 nearest to Fig. 1 said rim is just thick enough to occupy the space K in the band D after the dogs of the one have passed through the slots of the other, and when these dogs and slots have passed each other the hollow cylinders, Figs. 1 and 2, are turned a little in opposite directions, the dogs occupying the space K in the band D. The dogs of cylinder, Fig. 2, will come behind the dogs on band D of cylinder, Fig. 1, and the two cylinders, Figs. 1 and 2, will be firmly attached to each other. Now, when the hollow cylinder, Fig. 2, is slipped onto the cylinder B, Fig. 1, and made fast by the dogs, then, by the use of the spanner-wrench, unscrew the band D. By so doing the band D will push the packing against the rim C, and as the rim C will keep the packing from slipping off the cylinder, the packing must, therefore, swell or expand so as to fill the cylinder, Fig. 2, and make the connection water-tight between the two parts of the coupling.

In order to connect the hose with the coupling, I take the convex-surfaced ring L, and, having formed the tubular end of the coupling with an annular enlargement on its inside, suited to gripe with the convex surface of the ring, the hose being placed between them, I then place the ring, the hose, and the coupling end together, so that the outer inclined surface of the internal ring and the inner inclined surface of the enlarged space in the coupling shall gripe or compress the hose in a direction as nearly as possible parallel with the axis of the hose-coupling, and so as not to strain the hose between acute griping corners or angles, which would cut or break it. To assist in holding the hose, grooves or ridges may be made inclined in one direction on the surface of the ring L, as shown. In order to insert the ring L and hose into the internally-enlarged part of the end S of the coupling, I make a shouldered joint in each part of the hose-coupling, dividing it into two tubular pieces, O M, between the end where the hose is inserted and the end which joins the other part of the coupling. On the tubular piece *o* of each part of the coupling is formed a projecting lip, on the exterior of which is cut a screw-thread, and on the interior of the tubular piece M is cut an internal screw-thread, to fit the other, so that the tubular pieces M O can be screwed together, as shown in Fig. 12. Now, by inserting the hose through the annular piece M, and inserting the ring L into the end of the hose, and then screwing the pieces M and O together, with the ring or tube L between them, I am enabled not only to bring the parts to proper place, but also to secure the tube or ring L within the coupling, so that it is entirely isolated from the ends where the coupling is united together, and no water is permitted to get behind it.

It is evident that any strain applied to the hose will only serve to bind it tighter between the internal tube or ring L and the external coupling. The inner end of the internal tube or ring L abuts against a shoulder within the tubular piece O, where it is held tightly when the hose is fastened in place.

The concave surface of the tube or ring L is at such an angle with the faces of the internal annular enlargement within the coupling at S that the annular cavity or space between the internal ring and coupling does not enlarge toward the end of the coupling from which the hose is inserted, so as to allow the hose to be drawn away from the coupling when once started from its seat between them.

I claim as new and of my invention—

1. The combination of the internal ring or tube L, the hose, and the coupling, substantially as described.

2. The combination of the tubular parts M and O with the hose and internal tube or ring L, substantially as described.

3. The combination, with the hose, of the internal ring or tube L, the jointed part of the coupling S, provided with the projecting end, fitted to unite it to the other part of the coupling, substantially as described.

SILAS H. LORING.

Witnesses:
JOHN E. CRANE,
WM. S. BROWN.